March 21, 1967 R. DE LA TRAMERYE 3,310,082
HAND TOOL
Filed July 31, 1964 5 Sheets-Sheet 1

March 21, 1967 R. DE LA TRAMERYE 3,310,082
HAND TOOL
Filed July 31, 1964 5 Sheets-Sheet 2

March 21, 1967 R. DE LA TRAMERYE 3,310,082
HAND TOOL
Filed July 31, 1964 5 Sheets-Sheet 4
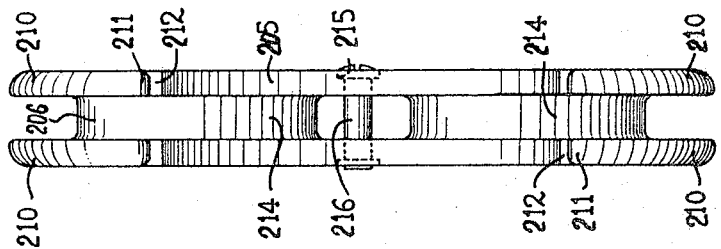
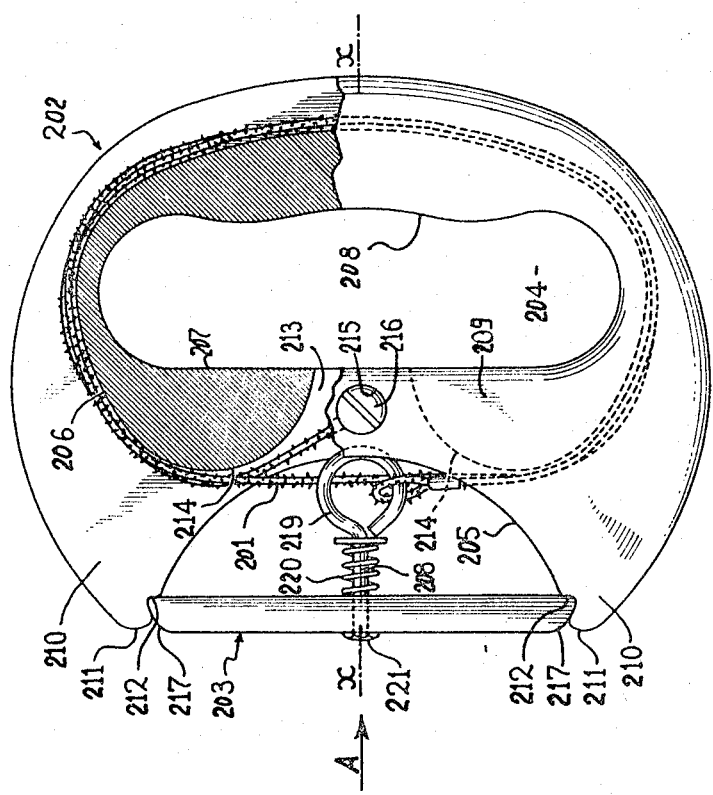

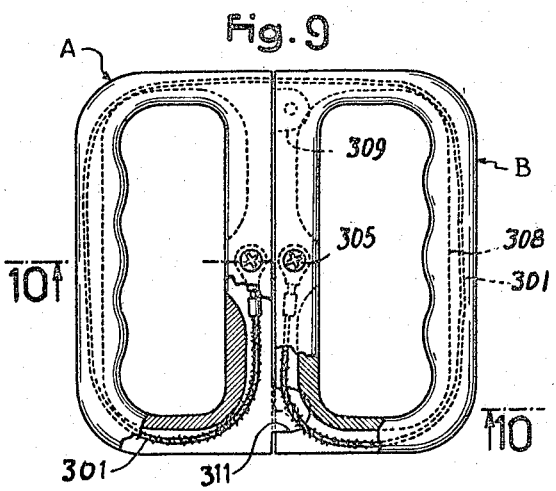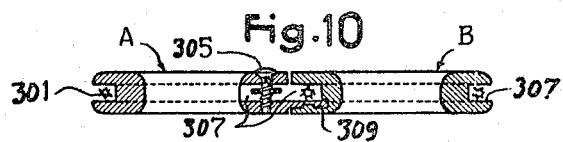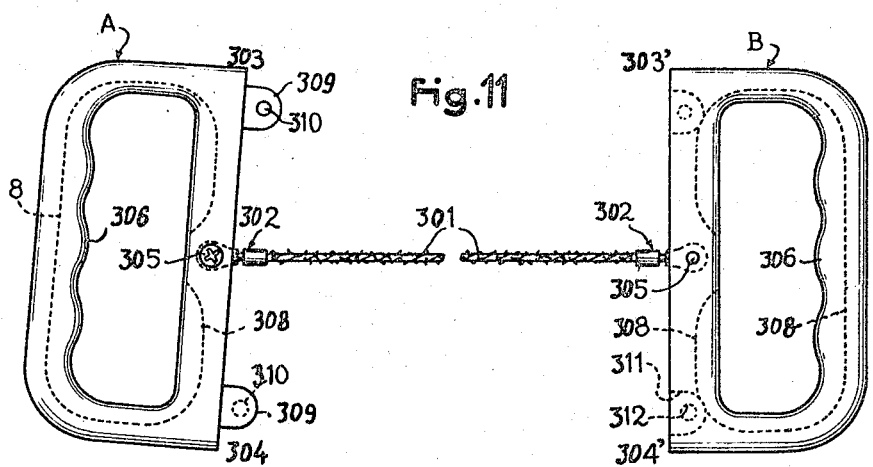

3,310,082
HAND TOOL
Raymond de la Tramerye, Paris, France, assignor to Société Anonyme Tubest, Paris, France, a company of France
Filed July 31, 1964, Ser. No. 386,703
Claims priority, application France, Aug. 2, 1963, 943,540; Mar. 25, 1964, 968,817
7 Claims. (Cl. 145—31)

The present invention relates to pocket saws of the type in which the tool consists of a flexible metal component, a metal wire carrying teeth or barbs on its periphery and linked, at each of its extremities, to a handle or other equivalent component.

Saws are already known in which the blades consist of one or several wires carrying asperities on their peripheries and which are sometimes cut out and twisted, with such blades being equipped at their extremities with means for gripping and traction such as rings or handles.

One of the principal disadvantages of a saw of this type is that its transportation and particularly in the pocket of a user, requires that the saw be initially placed in a pouch, a protective container or a metal or plastic box so as to prevent any contact between the blade and objects likely to be damaged by the asperities of the blade. The introduction of such a saw into a bag or any other protective receptacle means the user must manipulate the blade with his fingers thereby subjecting him to the risk of injury as well as possible bending the blade thus provoking deformation detrimental to the later use of the saw.

It is the object of this invention to remedy these drawbacks by attaching to at least one end of a conventional pocket saw wire a flanged spool member permitting the coiling of substantially the entire wire length and adapted to be gripped by the user for operating the saw when the wire is in its uncoiled condition.

In accordance with the invention, at least one of the end members of a conventional pocket saw wire, capable of being gripped for operation of the saw, is constituted by a flanged structure the flanges of which define a peripheral groove on the structure in which the wire is received when in an inoperative position.

Further objects and advantages of the invention will become apparent from the following detailed description and accompanying drawings, wherein:

FIG. 7 is a plan view of a third embodiment of the saw in retracted position;

FIG. 8 is a front view of the handle looking in the direction of arrow A in FIG. 7, with the cross-member constituting the second traction component having been removed;

FIG. 9 is a side elevational view partly broken away of another saw embodiment in retracted position;

FIG. 10 is a view taken along line 10—10 of FIG. 9, the view looking in the direction of the arrows; and FIG. 11 is a side view of the saw shown in FIG. 9 in extended or operative position.

Figure 1:
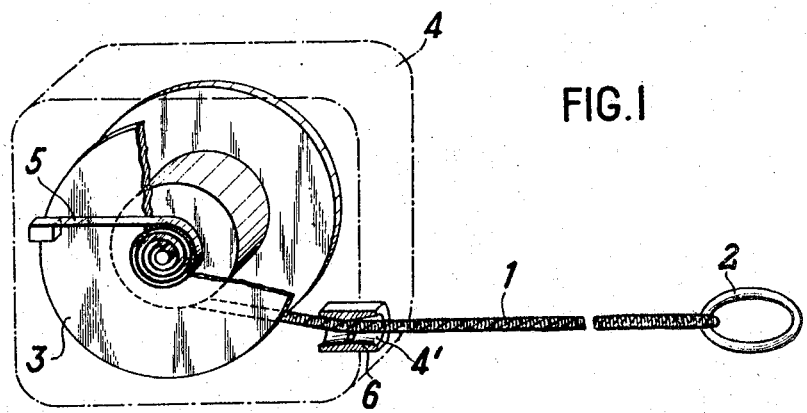
FIG. 1 is a perspective view of a saw embodying the invention, with the blade being shown in its operating position and partially withdrawn from the case.

The saw shown in FIG. 1 includes a flexible filiform blade 1 carrying, at one of its extremities, a gripping device such as a ring 2 and attached at its other extremity to a freely rotating drum 3 mounted in a case 4 provided with an orifice $4_1$ for the passage of the blade 1.

In the operative position shown in FIG. 1, the blade is drawn by the user between ring 2 and case 4, and the latter constitutes the second gripping device for the blade.

Figure 3:
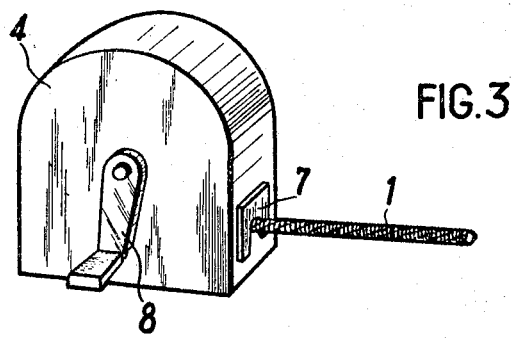
FIG. 3 is a perspective view of a modification of the saw disclosed in FIG. 1.

In the inoperative or transporting position, blade 1 is wound on to drum 3, with the latter being linked to means controlling its rotation in the winding direction of blade 1. Such controlling means can consist of a winding key or the like 8 coupled to drum 3 (FIG. 3) and controllable from the exterior of case 4, or, as shown in FIG. 1 by a return spring 5 attached by one of its extremities to case 4 and by its other extremity to drum 3. The spring 5 is arranged so as to initiate rotation of drum 3 and, as a result, the winding of blade 1 on the drum as soon as the user releases ring 2, with the blade 1 then completely retracting into case 4 and the gripping device 2 coming to its end-of-travel against the case.

In order to facilitate the travel of blade 1 from the inoperative to the operative position or vice-versa, since the asperities of the blade could, in effect, foul case 4, the case is preferably equipped with a guiding device such as shown at 6 in FIG. 1 and the guiding device consists of an insert 6 through which blade 1 passes, with the bore of the insert being flared at both of its extremities.

Figure 2:
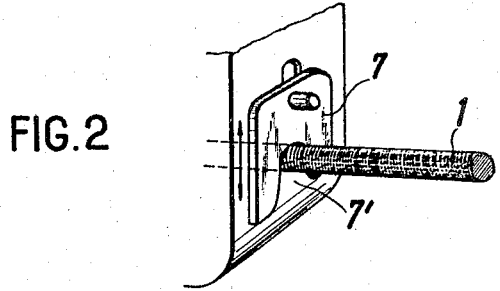
FIG. 2 is a fragmentary view of the saw shown in FIG. 1 illustrating one of the methods of manufacturing means for blocking the blade on the case.

Finally, the present saw may comprise a blocking device as shown on FIG. 2 so as to make it possible to retain the blade, when it is in use, relative to case 4. The blocking is effected by a slider 7 having a notch $7_1$ which moves in a straight line relative to the case (arrows in FIG. 2), thus enabling it to occupy two end-of-travel positions, namely the first or inoperative position in which the surface of notch $7_1$ remains completely apart from the travel of blade 1 and the second or operative position in which the surface of notch $7_1$ rests between two asperities of blade 1.

The saw can also be equipped with any other blocking device such as, for example, a lever having its fulcrum on case 4 and blocking the blade against the latter or, when drum 3 is driven by a winding key, by gears or by a lock which blocks the winding key and, as a result, the blade.

Figure 4:
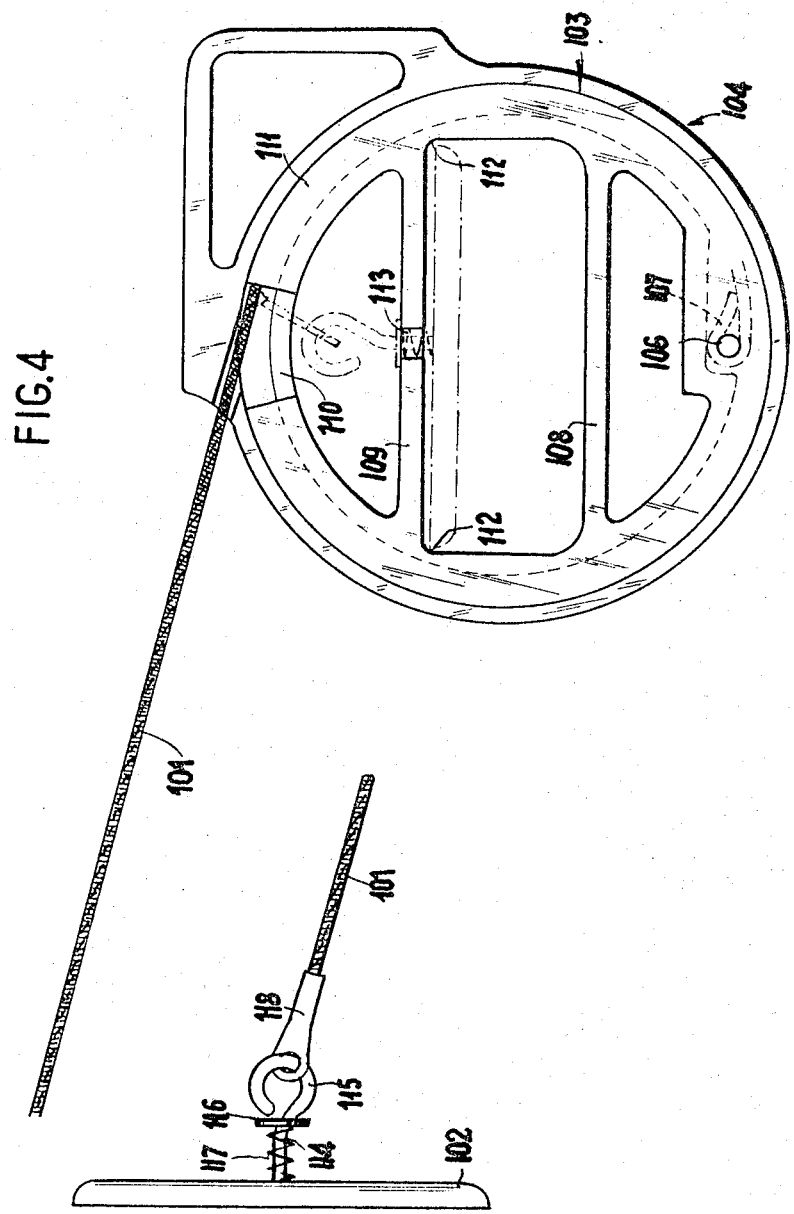
FIG. 4 is a front view of another saw embodiment in which the blade is represented by full lines in the "half out" position and by dotted lines in its "retracted" position.
Figure 6:
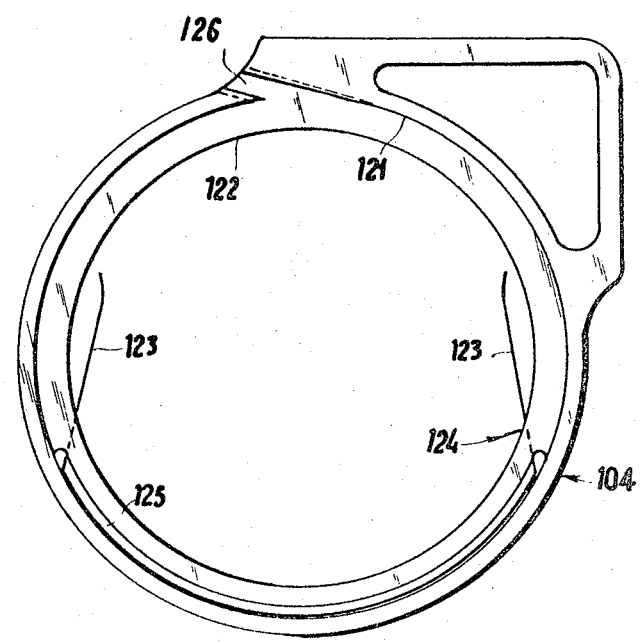
FIG. 6 is a front view of the saw case per se shown in FIG. 4.
Figure 5:
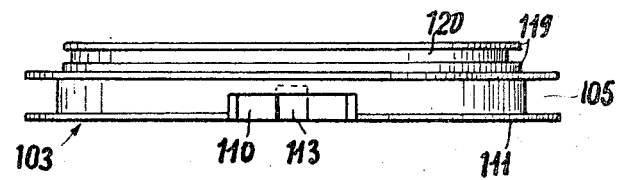
FIG. 5 is a top view of the drum per se of the saw shown in FIG. 4.

The saw shown in FIGS. 4 to 6 consists of a flexible filiform blade 101 which carries at one of its extremities a traction component consisting of a cross-member 102, and which is attached at its other extremity to a drum 103 mounted for free rotation in a case 104.

Drum 103 has the general shape of a short cylinder and is provided with a groove 105 in its periphery cooperable with case 104 for defining a housing for blade 101 in the "retracted" or "inoperative" position of the latter.

Attachment devices 106 which extend through drum 103 and project into the groove 105 enable the attachment of one extremity of blade 101 to drum 103. These attachment devices can consist of a screw-insert assembly and, in this case, the insert extends through a swivel 107 attached to the extremity of the blade.

On the other hand, drum 103 carries, in its central part, several separated spacers 108–109 one of which at least is sufficiently large for the easy passage of the user's fingers thus enabling the latter to use drum 103 in the extended position of the saw and, as a result, case 104 attached to the drum as a second traction component.

Besides, drum 103 has a sector-shaped clearance space 110 starting at front flange 111 and ending at the center of groove 105 to allow passage of the blade towards the interior of the drum when it is returned from "extended" to "retracted" position as shown in dotted lines in FIG. 4. In addition, one of the spacers, namely 109 of drum 103, and this on the inner surface of the drum is provided with a housing 112 designed for traction component 102 attached to the free extremity of the blade.

It will be seen that the depth of housing 112 is less than the thickness of drum 103 which thus limits the penetration of traction component 102. On the other hand, crossmember 109 is formed with a notch 113 to allow the passage of rod 114 on hook 115 by means of which the traction component 102 is attached to the free extremity of blade 101.

Preferably, hook 115 is not completely closed and the closing is assured by a free washer 116 on rod 114 which is pressed against the rounded extremity of hook 115 by spring 117 biased between the washer and component 102. By reason of this device, the disengagement of traction component 102 from the extremity of blade 101 is extremely easy since it is only necessary to push washer 116 towards traction component 102 prior to uncoupling hook 115 from swivel 118 attached to the extremity of blade 101. The drum 103 is provided on its rear surface with a cylindrical shoulder 119 the peripheral surface of which is provided with a groove 120 for receiving the elastic locking devices of drum 103 on case 104 as will later be described.

The case is formed with a flattened shape corresponding to that of drum 103, and the case 104 is provided with a cylindrical housing designed to receive the drum 103 (FIG. 5). The cylindrical housing has two bearing surfaces, one of which denoted 121 has the diameter of the flanges enclosing groove 105 in the periphery of drum 103, and the other of which indicated at 122 the diameter of the cylindrical shoulder 119 carrying locking groove 120.

The locking devices designed to maintain drum 103 in case 104 without hindering the free rotation of drum 103, consist preferably of two arms 123 of a U-shaped spring rod 124, the middle section of which is engaged in a groove 125 provided on the inner surface of case 104. The arms of rod 124 are in locking position loaded in groove 120 of drum 103 and case 104 also is provided with a slot 126 opening into the housing of blade 101 situated between drum 103 and case 104. The aforementioned slot is tangent to the housing thus enabling simple and convenient guiding of the blade towards and to the exterior of the case. The case 104 is provided, close to slot 126, with a space in the shape of a handle 127. The handle 127, the size of which is sufficient to afford the passage of at least one of the user's fingers, facilitates the grip of the latter and the handling of the saw during the process of bringing blade 101 into "extended" position or its operative position. Moreover, this handle may be used to hang the saw either on to the user's equipment (belt, bag, etc.) or on to a stand in a shop.

While drum-case assembly is preferably manufactured in molded plastic it may be either totally or partially, of any other suitable material.

The operation of the saw shown in FIGS. 4 to 6, is particularly simple since, from the inoperative position of the blade (shown in dotted lines in FIG. 4) to bring blade into "extended" or operative position (shown in full lines in FIG. 4) only requires the following movements:

(a) The user holds the case with one hand while passing at least one finger through the space in handle 127;

(b) With his other hand, he grips the traction component embedded untilt his time in housing 112 of the drum and then pulls on the blade until the latter is completely extended; and (c) The user then engages the fingers of one hand in the space included between spaces 108 and 109 and holds the drum and the case as a traction component while holding the other traction component in the other hand and the blade is now in tension and operative position.

After use, the retraction of the blade into its receptacle can be effected very simply since it suffices:

(a) To hold the case with one hand and cause, with the other, the rotation of the drum within the case; and (b) To place the traction component, after termination of winding in its housing and embedded the same in the housing by exerting a slight pressure thereon.

The saw shown in FIGS. 7 and 8 consists of a flexible metal wire provided with grooves, teeth, barbs or other serrations along its entire length and linked, at each extremity, with a traction component 202, 203 in a known manner.

Traction component 202 of rigid moldable plastic material is of generally circular shape and includes a space 204, and a cut-out 205 and, on its periphery, a groove 206 having a U-shaped transverse section. The space 204 is of elongated shape and one of its sides 207 is straight and situated, substantially, on a diameter of component 202 while its other side 208 is slightly corrugated and its extremities rounded so as to form a handle.

Cut-out 205 is of semi-circular shape and extends a certain distance from straight side 207 of space 202 so as to leave, between such side and itself, a part 209 having a width sufficient to possess satisfactory strength. It will be seen that cut-out 205 faces the exterior of component 202 and coacts with the periphery to constitute two projecting symmetrical parts 210 on both sides of the axis of symmetry $x$—$x$ of component 202 as shown on FIG. 7.

The groove 206 has a variable depth which is greater in the region of projecting parts 210 and traction component 202 carries four lugs 211 distributed in two symmetrical pairs. Each pair of lugs is at the extremities of the projecting parts and is divided in two in width by groove 206. Each lug 211 is provided with a notch, which forms a shoulder or bearing surface 212 facing towards the interior of cut-out 205, and these bearing surfaces each face each other in pairs. Moreover, groove 206 leads to an interior space 213 of the same width at the center of part 209 having rounded sides 214 thus prolonging the bottom of the groove on both sides of axis $x$—$x$.

In part 209, on the axis of symmetry $x$—$x$ a transverse hole 215 has been provided in which is placed a bolt 216, a rivet or other attachment, which extends through an eyelet formed at one of the extremities of flexible component 201 so as to attach the latter in an oscillating manner to component 202 at about the center of the periphery of the latter.

The opposite extremity of component 201 carries another eyelet by which it is linked to traction component 203. This component consists of a metal plate, for example, the end portions of which are slightly rounded at 217 and the total length of which is such that traction component 203 can be embedded in the notches of lugs 211 wherein it is elastically retained on bearing surfaces 212.

Traction component 203 has a hole drilled at its center through which extends, with loose tolerance, rod 218 of a closed hook 219, which receives the eyelet of flexible component 201, and a spring 220 surrounds the rod between the traction component and the rounded part of hook 219. Moreover, rod 218 is held on the outside of component 203 by a flattened head 221 provided on its extremity. The flexible component 201 is of such length that when it is wound around component 202 in groove 206, its extremity linked to component 203 is placed plumb on bolt 216 for a whole number of winding turns.

In a preferred embodiment, the dimensions of traction component 202 are such that when flexible component 201 is 80 cm. in length, the component can be wound three full turns in groove 206. Since rod 218 of hook 219 can swivel in traction component 203, it easily passes between lugs 211 at the end of winding. Component 203 is then turned around rod 218 so as to bring the extremities opposite bearing surfaces 212 and embed them in the slots.

In order to lighten traction component 202, it is possible, if so desired, to cut openings in parts 210 of lugs 211. It is also possible to give the internal part of traction component 203 a shape including rounded parts similar to those on the sides of space 204 so as to receive the fingers of the user.

The saw shown on FIGS. 9 to 11 includes a flexible component 301 consisting of a metal wire of steel or iron of known type, having cutting barbs or teeth on its surface and the component 301 is linked at each extremity by means of swivels 302 at a point situated at about the center of one of their sides, to two handles A and B. The handles A and B are preferably of an appropriate molded plastic material and are of general rectangular shape, and each has two right angles 303, 304 and 303', 304', respectively on both sides of a straight side in the center of which swivels 302 are oscillatingly attached by means of bolts or rivets 305. Handles A and B have, of course, spaces as previously explained and can include corrugated and rounded parts, such as 306 so as to receive the fingers of the user. The handles A and B each have a groove 307 (FIG. 10) in the periphery, with the bottom of the groove being shown at 308 (FIGS. 9 and 11) and male and female linkage devices (handle A and handle B respectively).

The male linkage devices on handle A consist of two tabs 309 arranged close to angles 303 and 304, respectively and extending perpendicularly to straight edge 303, 304 on both sides of groove 307. Moreover, tabs 309 each are formed with a rounded depression 310.

The female linkage devices on handle B consist of four recesses 311 arranged in pairs close to the right angles 303', 304', on both sides of groove 307, and each recess is formed with a rounded projection 312 having a shape complementary to that of the tab 309.

To fold the tool, flexible component 301 is wound in the groove 307 in each of handles A and B simultaneously and in opposite directions, and the length of component 301 is such that when the straight sides 303–304 and 303'–304' are in contact along their entire length and tabs 309 are completely within the recesses 311, the entire flexible component 301 is housed in groove 307 which is uninterruped over the entire periphery of the assembly. The handles A and B held together by the mating of the depressions 310 and the projections 312 of the linkage devices.

Since the flexible component 301 is completely housed in groove 307, the entire tool including both handles A and B can be easily transported in a pocket of the user's garment without risk of catching or damaging the garment and the tool can be ready for immediate use by separation of the two handles and unwinding of the flexible component. It will be noticed that the arrangement of the linkage devices is such that the two handles can be assembled even if one of the handles has turned through an angle of 180° relative to the other.

The invention is not to be confined to any strict conformity to the showings in the drawings but changes or modifications may be made therein so long as such changes or modifications mark no material departure from the spirit and scope of the appended claims.

What I claim is:
1. A pocket saw comprising a flexible tool having opposite extremities and asperities on the periphery thereof, first gripping means attached to one of said extremities, second gripping means attached to the other of said extremities, at least said first gripping means including a drum structure permitting the winding up of substantially the entire length of the tool thereon, and means on said first gripping means for releasably locking said first and second gripping means together when said tool is wound up on said drum.

2. The pocket saw according to claim 1 in which the drum comprises a short cylinder provided with a groove in its periphery bordered by two side flanges, a case for said drum with said case and drum being of complementary configuration, and said groove and case defining a closed annular housing containing the wound tool.

3. The pocket saw according to claim 2 in which the central part of the drum is provided with spaces between several spacers, at least one of the spaces defining a housing adapted to receive the gripping means attached to the free extremity of the wound tool.

4. A pocket saw according to claim 1 including a case for said drum, means to manually rotate the drum in the winding direction of said tool onto said drum, the case and drum being of complementary shapes and defining a closed annular housing containing the wound tool, said drum being a short cylinder provided with a groove in the periphery thereof bordered by two side flanges, the central part of the drum having spaces between several spacers, at least one of the spacers defining a housing adapted to receive the gripping means attached to the free extremity of the wound tool, one of the side flanges being formed with a cut-out in the shape of a sector to facilitate the entry of the free extremity of the tool towards the central part of said drum and the introduction of the last named gripping means into its housing.

5. The pocket saw according to claim 1 including a case for said drum, means to manually rotate the drum in the winding direction of said tool onto said drum, said drum comprising a short cylinder provided with a groove in its periphery bordered by two side flanges with said groove and case defining a closed annular housing containing the wound tool, said drum having on one of its surfaces a cylindrical shoulder provided with a groove in its periphery, a locking spring for the case coacting with the groove in the shoulder of the drum to normally maintain the latter in the case, the case having two bearing surfaces, one being located at the diameter of the drum flanges, and the other at the diameter of the shoulder of said drum.

6. The pocket saw according to claim 1 including a case for said drum, means to manually rotate the drum in the winding direction of said tool onto said drum, the case and drum being of complementary shapes and defining a closed annular housing containing the wound tool, the drum having on one of its surfaces a cylindrical shoulder provided with a groove in its periphery, and the case having a locking spring coacting with the shoulder groove of the drum to normally maintain the latter in the case.

7. The pocket saw according to claim 1 including a case for said drum, means to manually rotate the drum in the winding direction of said tool onto said drum, the case and drum being of complementary shapes, the drum and case defining a closed annular housing containing the wound tool, the case having a space in the shape of a handle grip for the unwinding of the tool which automatically orientates said case for the extension of said tool through a fixed opening in said case and tangent to the drum.

References Cited by the Examiner

UNITED STATES PATENTS 2,443,928   6/1948   Passarelli _____ 143—17 XR

FOREIGN PATENTS 1,191,560   4/1959   France.

WILLIAM FELDMAN, *Primary Examiner.*

R. V. PARKER, JR., *Assistant Examiner.*